United States Patent [19]
Bridges

[11] Patent Number: 5,651,523
[45] Date of Patent: Jul. 29, 1997

[54] ARTICLE SUPPORT SYSTEM HAVING MULTIPLE UTILITIES

[75] Inventor: John A. Bridges, Nashville, Tenn.

[73] Assignee: Aladdin Industries, Inc., Nashville, Tenn.

[21] Appl. No.: 522,137

[22] Filed: Aug. 31, 1995

[51] Int. Cl.$^6$ ..................................................... A47K 1/08
[52] U.S. Cl. ..................... 248/311.2; 206/549; 220/23.4; 224/926
[58] Field of Search ............................ 248/311.2, 224.7, 248/225.15; 224/926; 220/23.4, 23.83; 206/549

[56] References Cited

U.S. PATENT DOCUMENTS

| | | |
|---|---|---|
| 937,850 | 10/1909 | Parker . |
| 1,389,594 | 9/1921 | Moore . |
| 1,544,972 | 9/1925 | Gebelein . |
| 1,922,127 | 8/1933 | Foley . |
| 2,107,023 | 2/1938 | Bertsch . |
| 2,117,180 | 5/1938 | Kronquest . |
| 2,584,557 | 2/1952 | Cuthbertson . |
| 2,640,595 | 6/1953 | Byford . |
| 2,767,563 | 10/1956 | Picascia . |
| 2,799,147 | 4/1957 | Crawford, Jr. . |
| 2,805,017 | 9/1957 | Hill et al. . |
| 2,963,256 | 12/1960 | Borah . |
| 3,051,303 | 8/1962 | Daanen et al. . |
| 3,079,037 | 2/1963 | Schechter . |
| 3,107,028 | 10/1963 | De Roberts . |
| 3,250,422 | 5/1966 | Parish . |
| 3,257,024 | 6/1966 | Semanchik . |
| 3,273,739 | 9/1966 | Wei . |
| 3,301,293 | 1/1967 | Santelli . |
| 3,402,844 | 9/1968 | Chin . |
| 3,456,864 | 7/1969 | Trombley et al. . |
| 3,526,335 | 9/1970 | Swett et al. . |
| 3,642,239 | 2/1972 | Zeiler . |
| 3,800,939 | 4/1974 | Cornelius . |
| 3,808,084 | 4/1974 | Doty . |
| 3,949,876 | 4/1976 | Bridges et al. . |
| 4,040,549 | 8/1977 | Sadler . |
| 4,071,163 | 1/1978 | Martin . |

(List continued on next page.)

FOREIGN PATENT DOCUMENTS

| | | |
|---|---|---|
| 030562 | 6/1981 | European Pat. Off. . |
| 260055 | 3/1988 | European Pat. Off. . |
| 1564560 | 4/1969 | France . |
| 2628961 | 9/1989 | France . |
| 3512806 | 10/1986 | Germany . |
| 102182 | 12/1916 | United Kingdom . |
| 488427 | 7/1938 | United Kingdom . |
| 9106445 | 5/1991 | WIPO . |
| 9220267 | 11/1992 | WIPO . |

OTHER PUBLICATIONS

Page of Herrington Catalog, Spring 1991.

*Primary Examiner*—Ramon O. Ramirez
*Attorney, Agent, or Firm*—Greenblum & Bernstein P.L.C.

[57] ABSTRACT

A system for supporting at least one article, comprising an article support member and a base support member for supporting a base member of the article support. The article support comprises a member comprising a first end including a base member projecting therefrom, and a second end including an article support portion capable of supporting at least one article. The base support member comprises a wall which defines a cavity for receiving a portion of the base member projecting from the first portion of the member. Further, the cavity is provided with a protrusion. Preferably, the base support member comprises a cupholder in an automotive vehicle. The base member comprises a first portion capable of interacting with the protrusion, and a second portion capable of interacting with the wall defining said cavity, to cause wedging in response to downward movement of the second end to thereby restrain the second end from further downward movement or in response to tilting of the base member to thereby restrain the base member from further tilting. A beverage container holder is also provided, which can accommodate beverage containers of various sizes and shapes.

46 Claims, 15 Drawing Sheets

U.S. PATENT DOCUMENTS

| | | |
|---|---|---|
| 4,120,419 | 10/1978 | Saunders . |
| 4,127,211 | 11/1978 | Zerby . |
| 4,224,764 | 9/1980 | Dziewulski et al. . |
| 4,299,161 | 11/1981 | Collias . |
| 4,344,530 | 8/1982 | deLarosiere . |
| 4,467,934 | 8/1984 | Hummer . |
| 4,517,851 | 5/1985 | Tice . |
| 4,524,701 | 6/1985 | Chappell . |
| 4,573,597 | 3/1986 | Adams et al. . |
| 4,606,523 | 8/1986 | Statz et al. . |
| 4,607,758 | 8/1986 | Stevens . |
| 4,643,381 | 2/1987 | Levy . |
| 4,655,425 | 4/1987 | Wallace et al. . |
| 4,721,216 | 1/1988 | Kinder . |
| 4,732,292 | 3/1988 | Supik . |
| 4,733,790 | 3/1988 | Stein . |
| 4,793,491 | 12/1988 | Wolf et al. . |
| 4,795,211 | 1/1989 | Stern et al. . |
| 4,796,791 | 1/1989 | Goss et al. . |
| 4,829,618 | 5/1989 | McKee . |
| 4,898,297 | 2/1990 | Wheeler . |
| 4,919,381 | 4/1990 | Buist . |
| 4,928,876 | 5/1990 | Marshall . |
| 4,989,742 | 2/1991 | Powell . |
| 4,998,696 | 3/1991 | Desjardins . |
| 5,007,610 | 4/1991 | Christiansen et al. . |
| 5,031,774 | 7/1991 | Morris et al. . |
| 5,052,649 | 10/1991 | Hunnicutt . |
| 5,088,673 | 2/1992 | Chandler . |
| 5,105,948 | 4/1992 | Morris et al. . |
| 5,115,937 | 5/1992 | Chausse et al. . |
| 5,118,063 | 6/1992 | Young, Sr. . |
| 5,170,720 | 12/1992 | Scheurer . |
| 5,180,088 | 1/1993 | de Angeli . |
| 5,273,182 | 12/1993 | Laybourne . |
| 5,312,013 | 5/1994 | Bridges . |
| 5,326,064 | 7/1994 | Sapien . |
| 5,330,145 | 7/1994 | Evans et al. ............ 248/311.2 |
| 5,465,891 | 11/1995 | Bridges . |

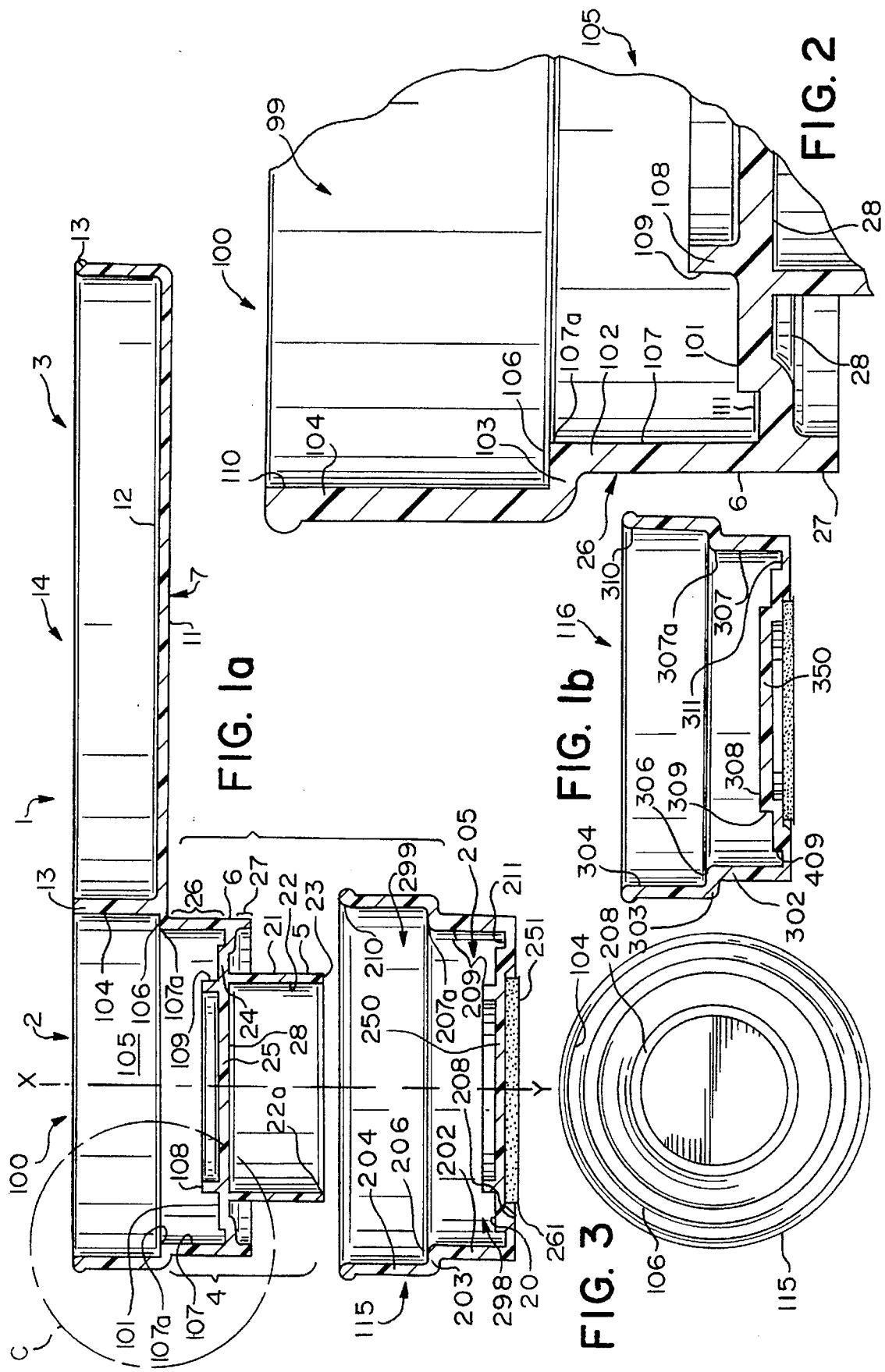

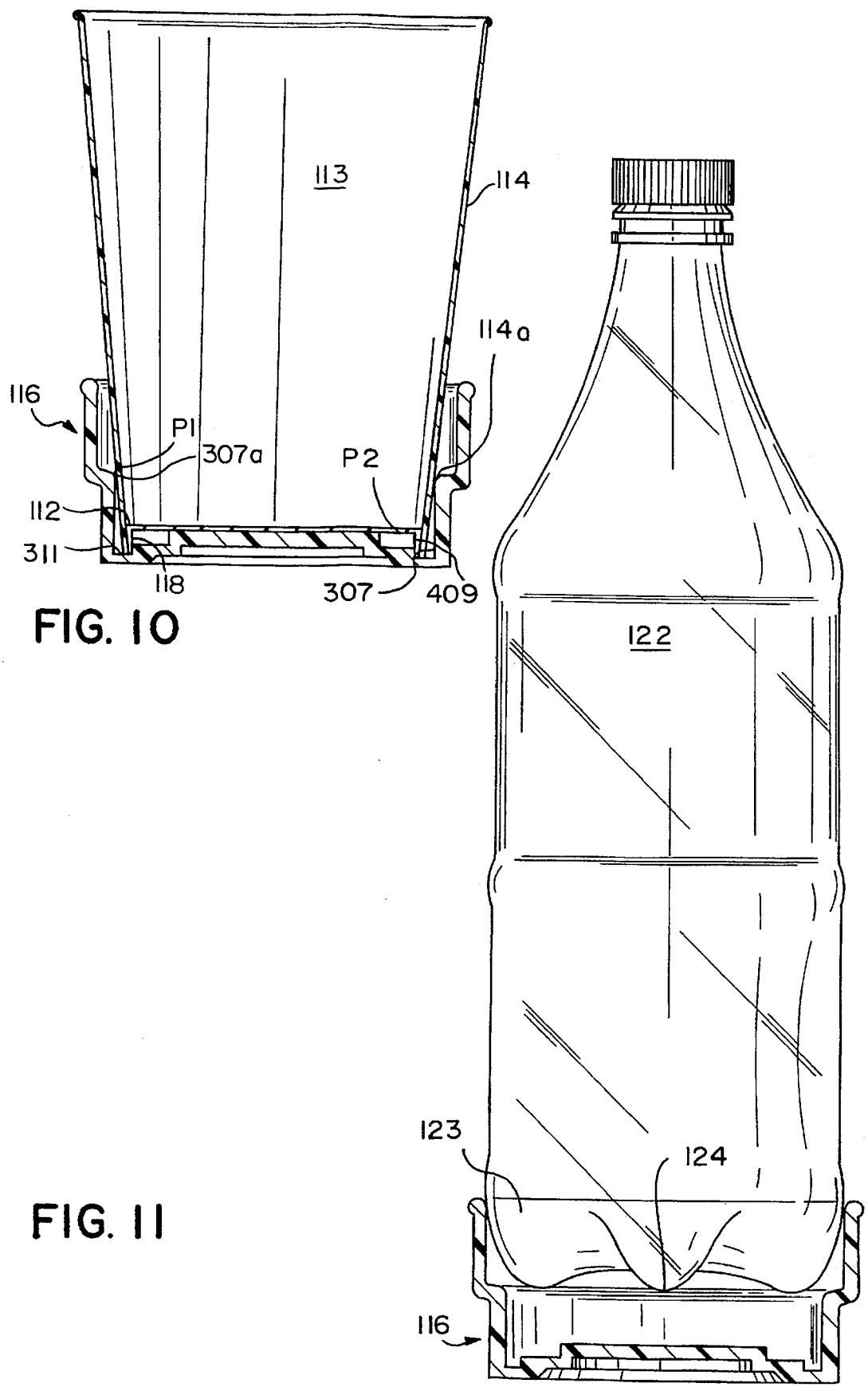

ARTICLE SUPPORT SYSTEM HAVING MULTIPLE UTILITIES

BACKGROUND OF THE INVENTION

1. Field of the Invention

The present invention relates to an article support system for supporting at least one article, and particularly to an article support system having multiple utilities and which is capable of supporting various types of articles, and which is also capable of interacting with cupholders in, for example, vehicles, including, but not limited to automotive vehicles, boats, aircraft, rail vehicles and agricultural equipment, such as riding lawn mowers. The invention is particularly suited for use in providing support for securely holding articles, including but not limited to food trays, note pads, cellular phones, coin holders, beverage containers and the like.

2. Description of Background Information

Vehicular travel, particularly automotive travel, continues to become an increasing aspect of modern society. For example, as more time is spent in automobiles, activities in automobiles other than driving have become common place. Thus, various systems have been provided for supporting various articles involved in such activities, such as, for example, note pads, cellular phones, meals, etc. As a result, automotive, marine vessel and aircraft interior designers have provided, among other things, power plugs for phones, mirrors for make-up, and, of course, cupholders. Most vehicles are manufactured and/or sold with at least some type of cupholder and such cupholders traditionally, have been of extremely varied size and configuration.

However, prior to the present invention, such cupholders have been of relatively limited utility. For example, while cupholders can be used incidentally to store, e.g., small items, and articles which can be friction-fit into the cupholder, cupholders are not associated with reliable article support systems. The present invention provides an article support system which is capable of very easily interacting with cupholders to provide such reliable support for supporting various articles.

The technology of this application is generally related to the technology disclosed in U.S. Pat. No. 5,312,013 to John A. BRIDGES and assigned to Aladdin Industries, Incorporated. U.S. Pat. No. 5,312,013 is a division of U.S. application Ser. No. 704,024, filed May 22, 1991, now abandoned. U.S. Pat. No. 5,312,013 is also related to currently pending application Ser. No. 07/980,113, filed Nov. 23, 1992, which is also a continuation of U.S. patent application Ser. No. 704,024, filed May 22, 1991, now abandoned.

The foregoing applications and patent to BRIDGES are hereby incorporated by reference as though set forth in full herein.

The technology disclosed in the foregoing documents provides a beverage container system which supports a variety of beverage containers and prevents beverage containers from tipping, even under extreme conditions, without requiring a substantial portion of the beverage container's overall height to be encircled in order for the beverage container to be adequately held.

Another approach involves the use of adapters inserted into cupholders. U.S. Pat. No. 5,088,673 to CHANDLER, U.S. Pat. No. 5,330,145 to EVANS et al., and U.S. Pat. No. 5,180,088 to DE ANGELI disclose examples of this approach.

Various article supports, such as trays, have been provided in combination with, for example, drink holders and the like. Thus, YOUNG, Sr., U.S. Pat. No. 5,118,063 discloses a concession tray used to carry food and drinks. The tray may be secured to an arm rest by means of one of three cup receptacles which can be inserted into a cupholder formed in an armrest.

However there is still a need for an article support system which is reliable and can interact with a vehicular or automotive container holder to reliably support, for example, food items, cellular phones, notepads, eyeglasses and the like, with minimal effort required on the part of consumer. Moreover, there is still a need for such an article support system which provides secure, reliable support for a variety of such articles, spaced a substantial horizontal distance from the cupholder or base support, and wherein the base support is capable of receiving and securely holding a variety of different containers of various sizes and configuration.

However, there has been a continuing need for improvement.

SUMMARY OF THE INVENTION

Accordingly, it is an object of the invention to provide an article support system which is relatively simple and easy to use and also capable of reliably supporting numerous and diverse articles.

Another object of the present invention is to provide an article support system wherein articles can be supported a distance from a first end of an article support member, with the articles being supported at a second end of the article support member and the first end of the article support member being supported by a base support member.

Still another object of the invention is to provide an article support system wherein the article support is capable of interacting with various cupholders in automotive vehicles.

Yet another object of the invention is to provide a support system wherein the cupholder with which the article support interacts also functions as a container holder, and preferably a beverage container holder, which provides a degree of standardization, so as to accommodate a variety of specialized and non-specialized containers.

These and other objects of the invention have been attained by providing a system for supporting at least one article, comprising an article support member and a base support member for supporting a base member of the article support.

The article support comprises a member comprising a first end including a base member projecting therefrom, and a second end including an article support portion capable of supporting at least one article.

The base support member can comprise a wall which defines a cavity for receiving a portion of the base member projecting from the first portion of the member. Further, the cavity can be provided with a protrusion.

The base member can comprise a first portion capable of interacting with the protrusion, and a second portion capable of interacting with the wall defining the cavity, to cause wedging in response to downward movement of the second end, or tilting of the base member, to thereby restrain the second end from further downward movement and/or restrain the base member from further tilting.

In preferred embodiments, the first portion of the base member comprises a generally tubular, inner wall portion and the second portion of the base member comprises a generally tubular outer wall portion. Preferably, the first and second tubular wall portions are connected by a connecting member, preferably a generally annular, generally planar wall member.

Preferably, the protrusion of the base support member comprises a generally annular rib, or a cylindrical member, disposed in the cavity and projecting upwardly from the base support member. Also preferably, the cavity formed by the wall of the base support member has an upper end having a diameter, and an additional wall extends from the upper end. The additional wall can comprise a planar wall, substantially parallel with a lower surface of the base support member, and can further comprise an upwardly extending wall portion. Details of certain preferred embodiments of the base support member are disclosed in the related applications to BRIDGES, discussed above.

The article support portion can comprise a member selected from the group consisting of a tray, a notepad support, a support for a writing implement, a support for eyeglasses, a support for a cellular phone, and combinations thereof.

The base support member can be part of (built into) the interior an automotive vehicle. For example, it can be integral with an armrest of a vehicle, an armrest built into a vehicle door, a vehicle dashboard, a door to an interior compartment of a vehicle, and/or a vehicle console.

The base support member can also comprise an anchor, e.g., an adhesive tab including a removable protecting sheet or an element adapted to be inserted between a seat cushion and a back cushion of an automotive vehicle. Alternatively or additionally the base support member comprises a hanger bracket.

The first end of the article support member may also preferably be provided with a container holder, e.g., a beverage container holder, which can preferably be identical to the base support member described above.

In other aspects the foregoing objects have been attained by providing an article support, comprising a first end including a base member projecting therefrom, and a second end including an article support portion capable of supporting the at least one article. In such preferred embodiments, the base member comprises a first portion capable of interacting with a protrusion in a base support member, and a second portion capable of interacting with a wall defining a cavity in the base support member, to cause wedging in response to downward movement of the second end or tilting of the base member, to thereby restrain the second end from further downward movement, and/or restrain the base member from further tilting. Other features and details of the article support are generally as described above and below.

In other aspects, the invention relates to an article support for supporting at least one article comprising a member comprising a first end, and a second end including an article support portion capable of supporting at least one article. The first end comprises a base portion including a wall, the wall including a top side and a bottom side and configured such that, at the top side the wall forms a container holder and at the bottom side the wall forms a portion constructed and arranged to interact with an automotive container holder in an automotive vehicle to support the article support member. Other features and details of the article support of this embodiment are generally as described above and below.

In other aspects, the invention relates to a kit, which can comprise various combinations of the article support member(s) discussed herein. Thus, such kits can include article supports of the invention which comprise at least one article support comprising a first end having a base portion capable of interacting with a cupholder in an automotive vehicle, and a second end having an article support portion, the article support portion comprising a member selected from the group consisting of a tray, a notepad support, a support for a writing implement, a support for eyeglasses, and combinations thereof.

BRIEF DESCRIPTION OF THE DRAWINGS

The foregoing and other objects, features and advantages of the invention will be apparent from the following more particular description of the preferred embodiments, as illustrated in the accompanying drawings, in which reference characters refer to the same parts throughout the various views, and wherein:

FIG. 1A is a generally transverse cross section of an article support and a combined base support member and container holder of one embodiment of the invention;

FIG. 1B is a generally transverse cross section of a base support and holder of another embodiment of the invention;

FIG. 2 is an enlarged cross-section of portion C of FIG. 1;

FIG. 3 is a top plan view of the base support member and holder of FIG. 1A;

FIG. 10 is a representation of the base support member and holder of FIG. 1B while supporting a standard, medium-sized "paper cup";

FIG. 11 is a representation of the base support member and holder of FIG. 1B while supporting a soft drink container, with the soft drink container being illustrated schematically;

DETAILED DESCRIPTION OF PREFERRED EMBODIMENTS

Figure 4:
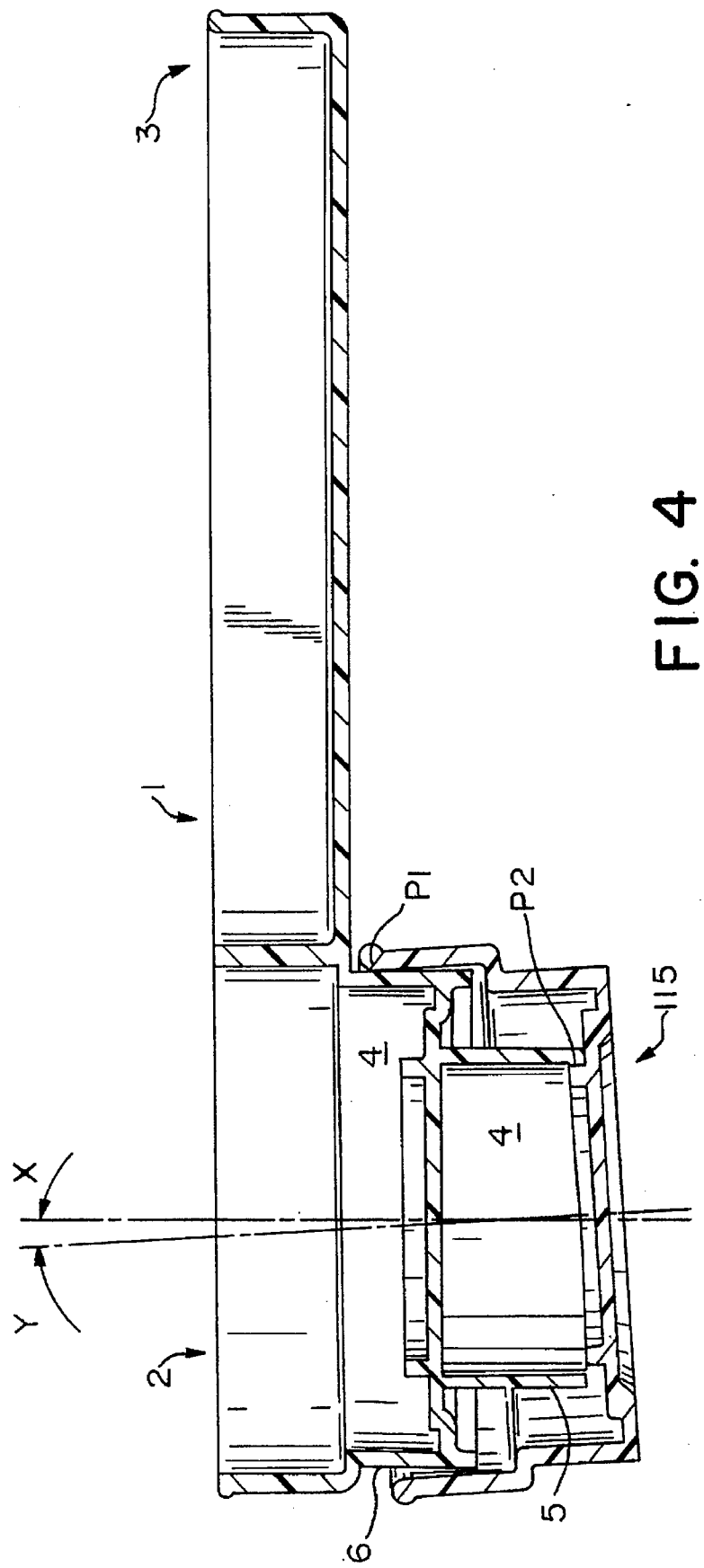
FIG. 4 is a generally transverse cross-section showing the interaction between the article support and the base support member and holder of FIG. 1A.

The present invention, surprisingly, provides support for numerous and diverse articles, supported on an article support portion of an article support member. The article support members of the present invention also comprise a base member capable of interacting with a base support member. Surprisingly, the article which is supported by the article support member, in preferred embodiments of the present invention, can be supported a substantial distance from the base support member, while still allowing the base member to be inserted into and/or removed from the base support member, with a minimum of frictional resistance. This result is achieved, even when the base support member is relatively shallow. In preferred embodiments, the base support member is a cupholder located in an automotive vehicle, or capable of being mounted on an automotive vehicle, at various locations.

FIG. 1A discloses an article support system of the invention, comprising an article support, generally designated as 1. The article support comprises a first end, generally designated as 2, and a second end, generally designated as 3. First end 2, comprises a base member projecting therefrom, generally designated as 4. Base member 4 comprises a first portion 5 which is capable of interacting with a protrusion, e.g., 108, 208 or 308, in a base support member, e.g., 100, 115 or 116, discussed more fully below. Base member 4 also comprises a second portion 6, capable of interacting with a wall defining a cavity in the base support member. Preferably, portions 5 and 6 are each in the form of a generally tubular wall, which is preferably generally circular in horizontal transverse cross section as can be seen from FIG. 6B. In such embodiments, walls 5 and 6 are preferably concentric or coaxial, as shown in FIG. 6B. Thus, portion 5 comprises a wall having an outer surface 21, an inner surface 22 and a lower end 23. Preferably, portion 5 extends downwardly from a connecting member 24, which in preferred embodiments comprises a generally annular wall.

Connecting member 24 additionally is preferably part of a generally circular wall 25. In this preferred embodiment, connecting member 24 extends between tubular wall 5 and tubular wall 6 and is generally transverse to both walls, and preferably generally perpendicular thereto, although it will be readily recognized that it may be at any angle with respect to walls 5 and 6 while connecting walls 5 and 6. In the embodiment of FIG. 1A, wall 6 includes an upper outer portion or surface 26 extending upwardly from connecting member 24 and a lower portion 27 extending downwardly from connecting member 24. Thus, as seen in FIG. 1A, wall 6 is disposed generally above and outside the circle or cylinder defined by wall 5.

Figure 5:
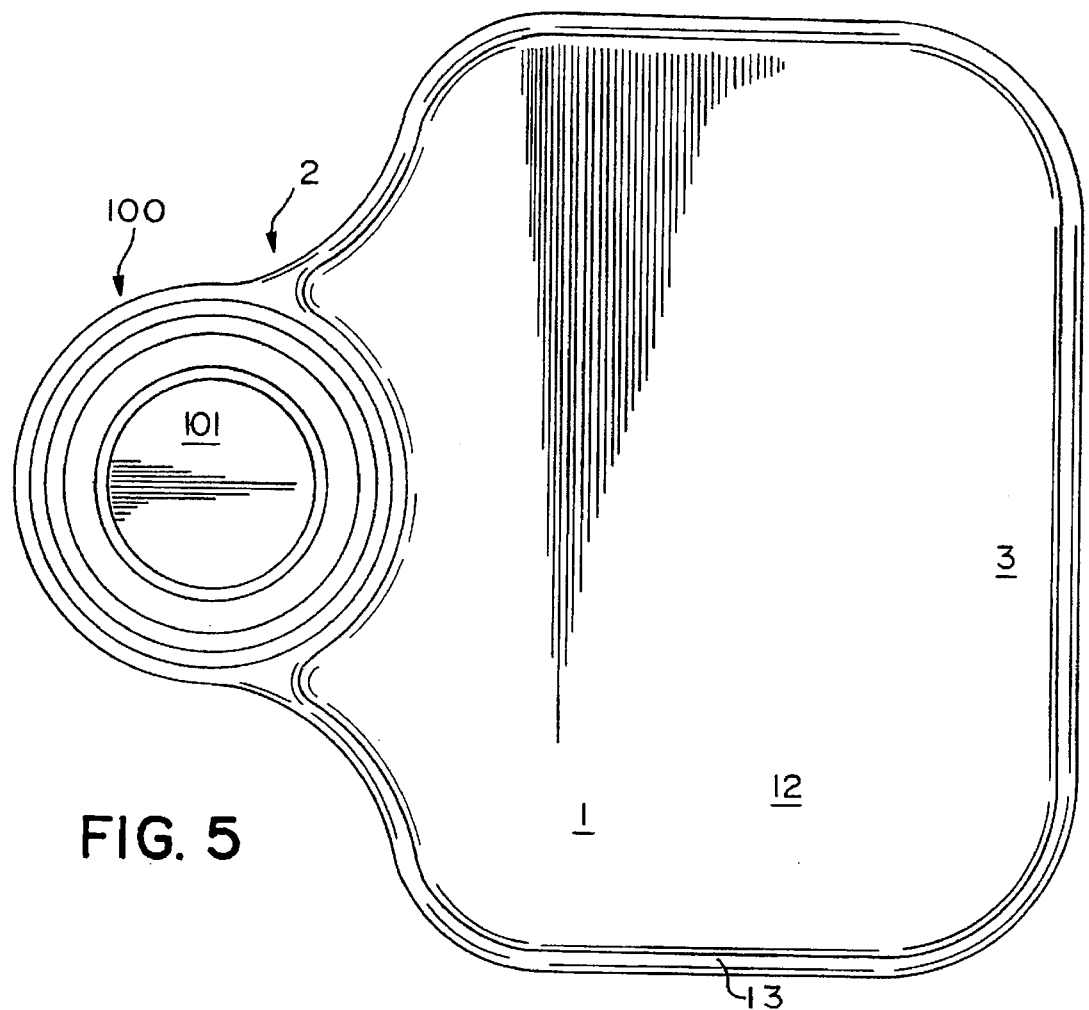
FIG. 5 is a top plan view of an article support in accordance with FIG. 1A.
Figure 6A:
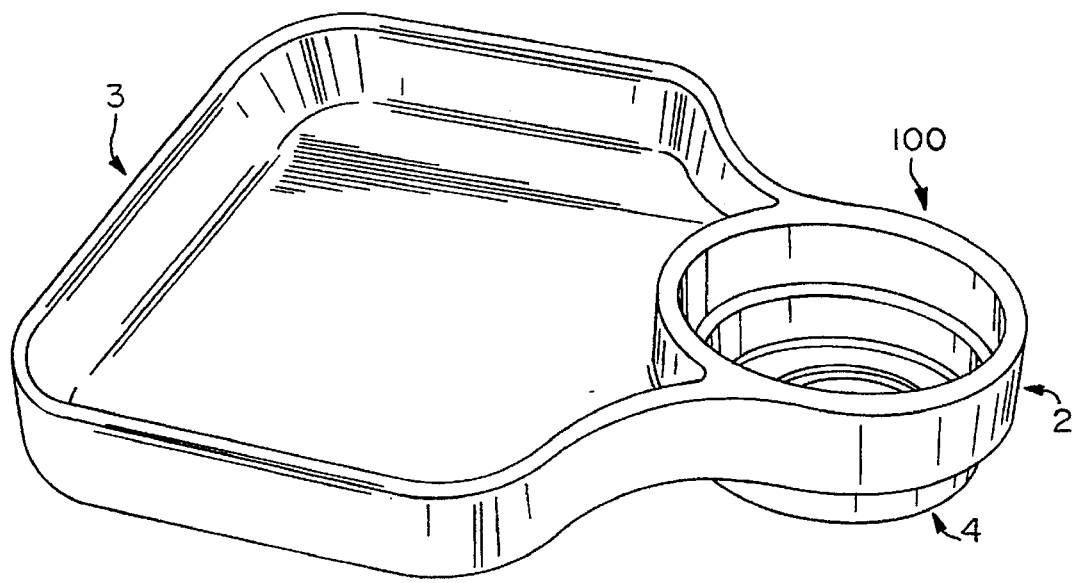
FIG. 6A is a perspective view of the article support of FIG. 5.
Figure 6B:
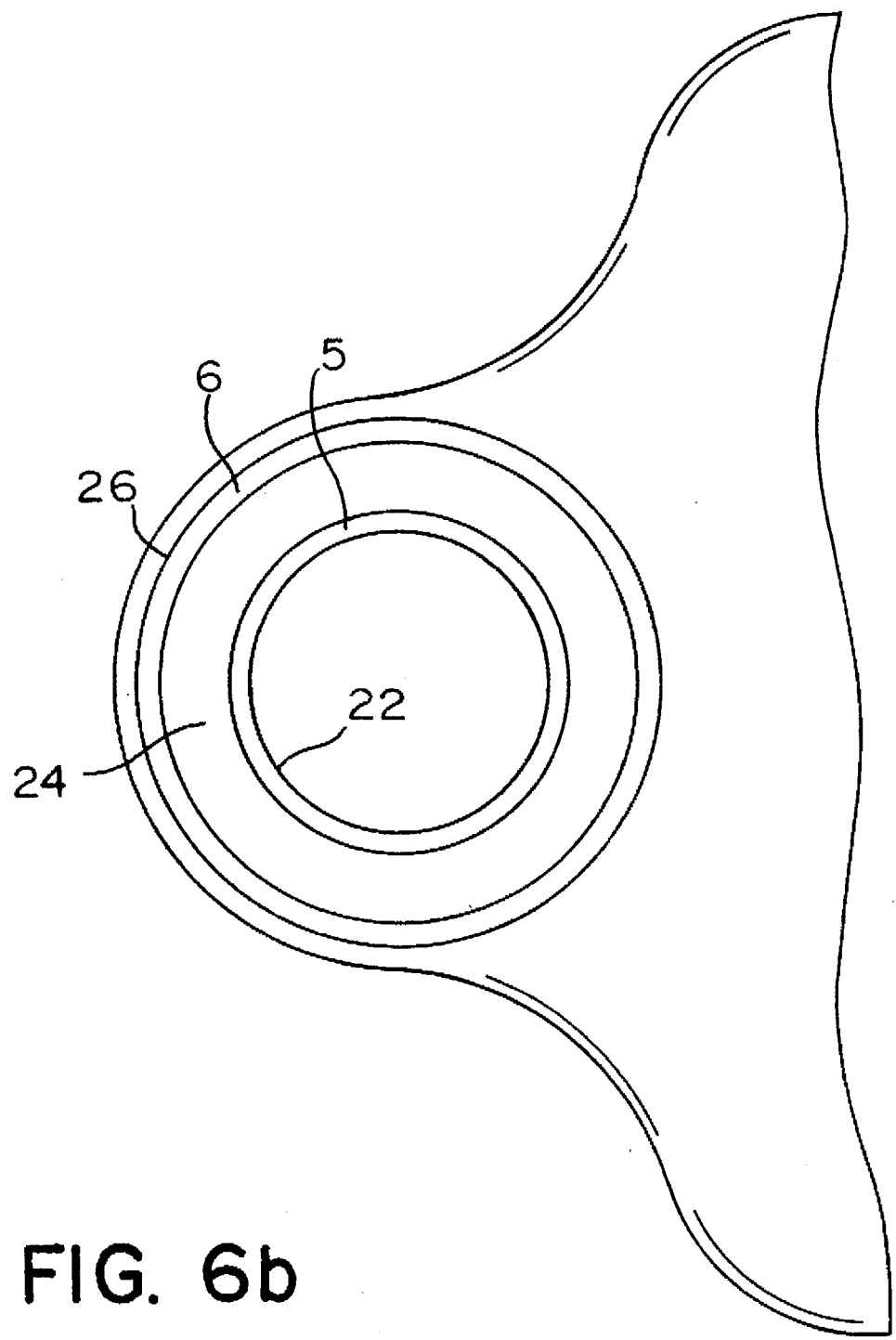
FIG. 6B is a bottom plan view of a portion of the article support member of FIG. 1 with a portion broken away, showing the base member.

Article support 1 includes an article support portion, generally designated as 7, which, in the embodiment of FIGS. 1–6, comprises a tray, generally designated as 14. As shown in FIGS. 1A, 5 and 6, tray 14 comprises a generally horizontal wall 11 having a generally horizontal planar article support surface 12, which serves to support various articles, e.g., meals, etc. Surface 12 can be surrounded by a sidewall, preferably an endless sidewall 13, which preferably encircles article support surface 12.

In the embodiment of FIG. 1A, first end 2 of article support 1 preferably comprises an additional base support member 100, which is preferably adapted to also function as a container holder, and most preferably a beverage container holder. As seen from FIGS. 1A and 2, container holder 100 comprises a base support surface 101 defined by the upper face or upper side of wall 25. Thus, wall 25, and particularly connecting member 24, also functions as a base support surface for the lower end or base of a container. Thus, wall 25 and connecting member 24, at the top side 101 of wall 25, comprise container holder 100, which can also be defined by the inner surfaces 107, 106 and 110 of walls 102, 103 and 104. Base member 4 is constructed and arranged to interact with a cupholder in an automotive vehicle. Bottom side 28 of wall 25 is preferably provided with a portion 5 for interacting with a cupholder of an automotive vehicle. Preferably, base member 4 is constructed and arranged to interact with a base support member 115 or 116 mounted in the interior of an automotive vehicle.

A generally vertically disposed wall 102 is connected to connecting member 24 and forms a cavity 105 adapted to receive therein the base of a beverage container. The inner surface 107 of wall 102 provides a first point of contact 107a at or adjacent to the upper end of wall for providing wedging.

A protrusion 108 extends upwardly from base support wall 25. Preferably protrusion 108 comprises a rib having an outer surface 109 which provides a second point of contact for causing wedging. Rather than being an annular rib, protrusion 108 can be cylindrical, as will be discussed below with respect to base support members 115 and 116. Alternatively, protrusion 108 can comprise a series of projections which cooperate to define an annular rib.

As will be readily apparent, inner surface 107 of wall 102 has a given diameter. An additional wall 103 extends from the upper end 107a of wall 102, and preferably comprises a generally planar portion which is parallel with wall 25. Preferably, additional wall 103 provides a generally horizontal surface 106. Preferably, wall 103 further comprises an upwardly extending wall portion 104, which comprises inner surface 110 preferably constructed and arranged for providing an additional point of contact for providing wedging, or which operates to provide a friction-fit, for some containers, such as a 20 ounce soft drink bottle.

Preferably, connecting member 24 is provided with an annular groove 111, which is adapted to receive the annular base portion 112 of "paper" cup 113, in a fashion similar to that shown in FIG. 10. Of course, cup 113 can be formed from a variety of other materials, e.g., foamed polystyrene, and the like.

Base member 4 is particularly adapted to interact with base support member 115 or 116 shown in FIGS. 1–4. Base support member 115 is preferably similar, and preferably identical to container holder 100. Thus, as illustrated in FIGS. 1A and 3, base support member 115 comprises a generally vertically disposed wall 202 connected to base support wall 250 and forming a cavity 205 adapted to receive therein the base of a beverage container. The inner surface 207 of wall 202 provides a first point of contact 207a for providing wedging when interacting with a container base.

A protrusion 208 extends upwardly from base support member 250. Preferably protrusion 208 can comprise a rib having an outer surface 209 which provides a second point of contact for causing wedging. However, as illustrated in FIG. 1B, rather than being an annular rib, protrusion 208 can be cylindrically shaped such as cylinder 308 including outer surface 309.

As will be readily apparent, the inner surface 207 of wall 202 has a given diameter at upper end 207a. An additional wall 203 extends from the upper end 207a of inner surface 207 of wall 202, and preferably comprises a generally planar portion which is parallel with base support member 250. Preferably, additional wall 203 provides a generally horizontal surface 206. Preferably, wall 203 further comprises an upwardly extending wall portion 204, which comprises inner surface 210 which is preferably constructed and arranged for providing an additional point of contact, which functions as a first point of contact for providing wedging, or which operates to provide a friction-fit, for some containers, such as a 20 ounce soft drink bottle.

In this embodiment, base support member 250 is also preferably provided with an annular groove 211, which is adapted to receive the annular base portion 112 of "paper" cup 113, in similar fashion to that shown in FIG. 10. As will be apparent, wall portion 204 defines a second cavity having a larger diameter than the cavity defined by wall 202. Thus, upper portion 299 has a diameter which is greater than the diameter of lower portion 298. This is preferred for the base support members according to the present invention, and is especially suitable for accommonating the base portion of larger containers, such as the base portion of a soft drink bottle.

The base support member 116 of FIG. 1B is preferably identical to base support member 115, except that a different protrusion configuration is employed. In the embodiment of FIG. 1B, protrusion 308 comprises a cylinder, which also provides a surface 309 which also provides a second point of contact for wedging. Thus, the inner surface 307 of wall 302 has a given diameter at upper end 307a. An additional wall 303 extends from the upper end 307a of inner surface 307 of wall 302, and preferably comprises a generally planar portion 306 which is parallel with base support member 350. Preferably, additional wall 303 provides a generally horizontal surface 306. Preferably, wall 303 further comprises an upwardly extending wall portion 304, which comprises inner surface 310 which is preferably constructed and arranged for providing an additional point of contact, which functions as a first point of contact for providing wedging, or which operates to provide a friction-fit, for some containers, such as a 20 ounce soft drink bottle.

In this embodiment, base support member 350 is also preferably provided with an annular groove 311, which is adapted to receive the annular base portion 112 of "paper" cup 113, in similar fashion to that shown in FIG. 10. As will be apparent, wall portion 304 defines a second cavity having a larger diameter than the cavity defined by wall 302, in identical fashion to base support member 115. Thus, upper portion 299 has a diameter which is greater than the diameter of lower portion 298. This is preferred for the base support members according to the present invention, and is especially suitable for accommodating the base portion of larger containers, such as the base portion of a soft drink bottle.

The interaction of article support 1 and base support member 115 to provide support for article support portion 7 of article support 1 is as follows, with particular reference to FIGS. 1A and 4. Specifically, in use as an article support, base member 4 of article support member 1 is inserted into the cavity defined by wall 202. In this preferred embodiment, when the longitudinal central axis X of base member 4 is coaxial with the central vertical axis Y of base support member 115, there is a loose-fitting relationship between the vertical walls of base support member 115 and base member 4. However as the article support member is tilted, such as by downward pressure on article support portion 7 such that axis X is tilted with respect to central vertical axis Y of base support member 115, upper outer surface 26 contacts inner surface 210 of the base support member at first point of contact P1, and lower end 22a of inner surface 22, contacts outer surface 209 of protrusion 208 at second point of contact P2. A force exerted at point P2, due to the downward pressure on article support portion 7, may be directed outwardly toward the article support member. A force exerted at point P1, due to the same downward pressure, is directed opposite to the force at point P2. Thus, the forces at both P1 and P2, due to the downward pressure on article support portion 7, are directed substantially perpendicular to the downward force. Under such conditions, a wedging action occurs between two spaced points of contact, P1 and P2, as shown in FIG. 4.

This is similar to the type of wedging action which is employed in the aforementioned BRIDGES applications and patent.

In addition, as with the wedging action of the aforementioned BRIDGES applications and patent, the more that downward pressure is applied to article support portion 7, the greater the wedging force becomes.

In a preferred embodiment, base support members 115 and 116 may also be provided with an adhesive tab 25, so that it may be removably secured to any planar surface. Prior to use, a removable film 261 is provided on adhesive tab 251 to protect it. When it is desired to install base support member 115 or 116, this film is easily peeled away, and the holder may be secured to the desired surface.

Due to its relatively low profile and its aesthetic appeal, base support member 115 or 116 is well suited for use in an automotive vehicle, aircraft, boat, or rail or other vehicle, where its use cannot be hidden from view and there is generally no convenient location for placing a beverage container. Indeed, although the invention is generally illustrated herein as being employed in automotive applications, it will be readily apparent to those of ordinary skill in the art that the invention is particularly suited for use in any application involving horizontal movement and where a beverage may also be desired, such as automobiles, aircraft, rail transportation, agricultural equipment including lawn mowers, etc, and these applications should be considered as equivalents to the automotive applications illustrated herein.

Advantageously, in preferred embodiments, the combined base support members 115 and 116 of the present invention can accommodate a wide variety of container bases and base portions of an article support. Thus, referring to FIG. 8, base support member 115 is adapted to receive the base member of an article support member of the present invention, or a beverage container such as a mug, a coinholder, a standardized beverage can, a cup or a bottle containing a beverage.

Figure 12:
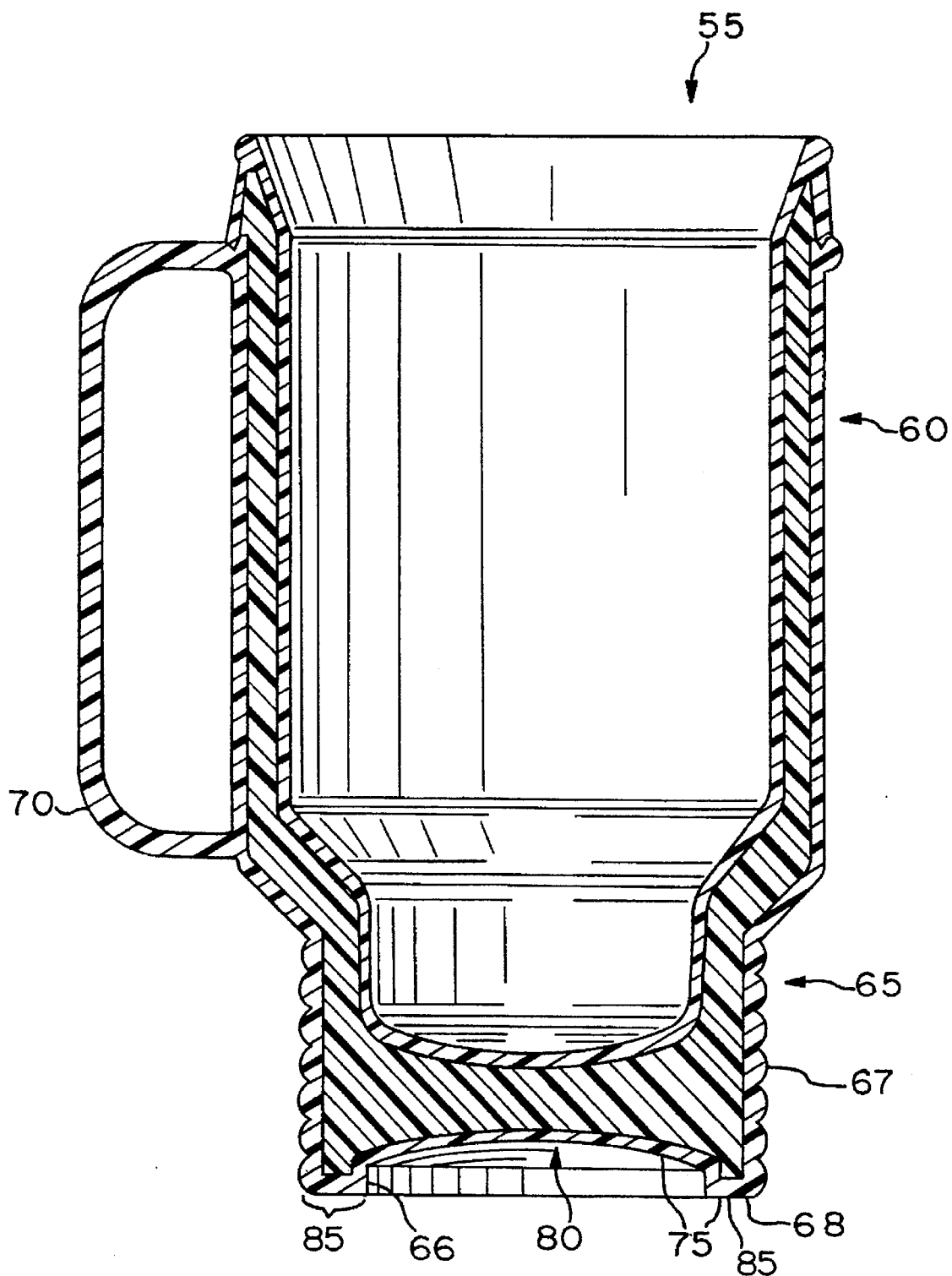
FIG. 12 is a cross-sectional view of a prior art beverage container adapted for use in the base support members and holders of the present invention.
Figure 13:
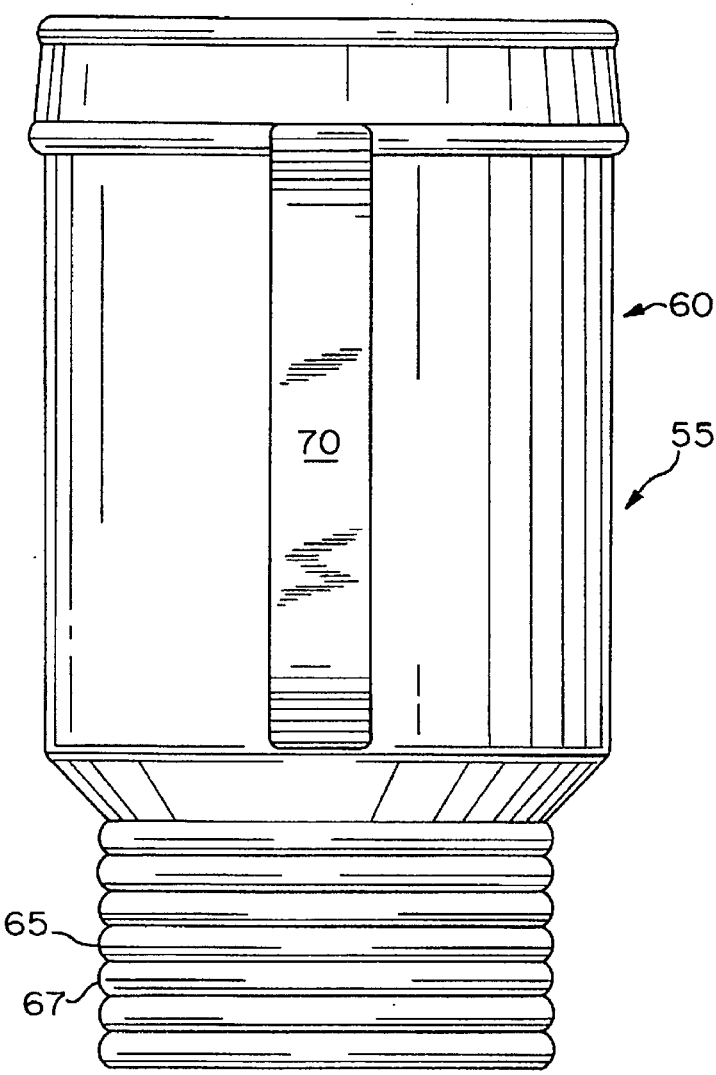
FIG. 13 is a side elevational view of the beverage container shown in FIG. 12.
Figure 14:
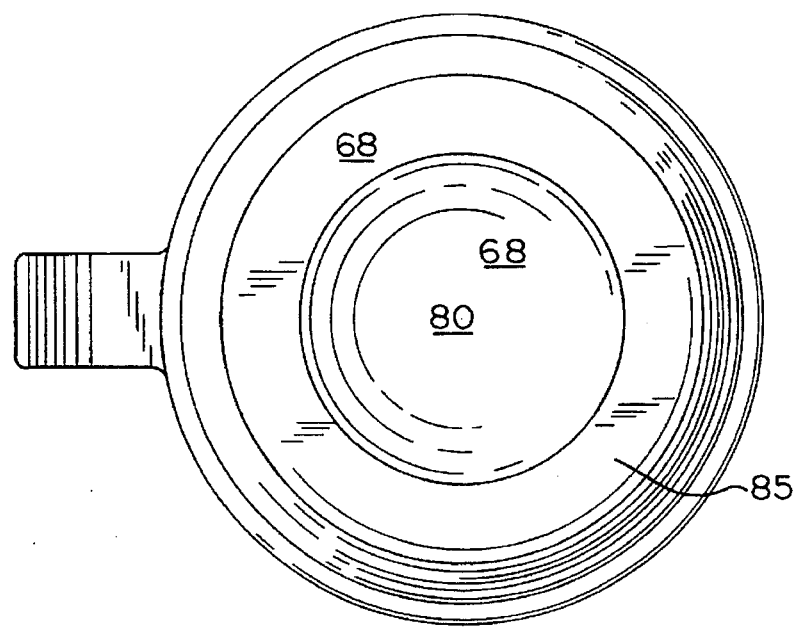
FIG. 14 is a bottom plan view of the beverage container shown in FIG. 12.
Figure 15:
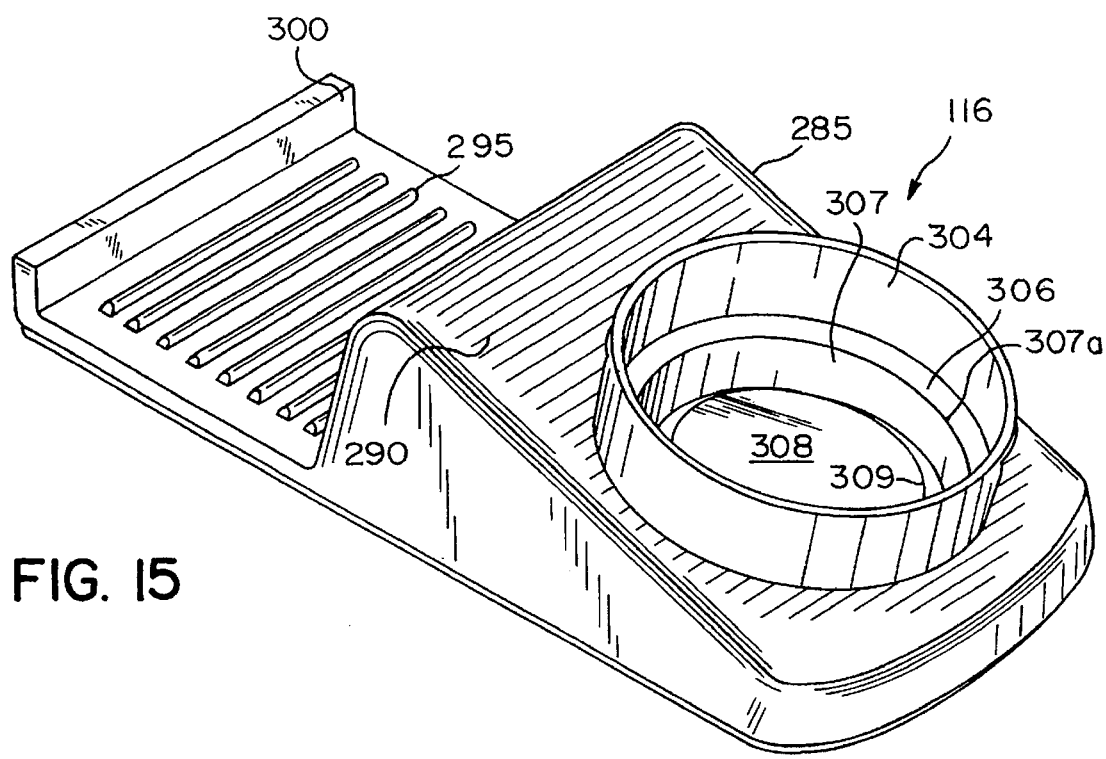
FIG. 15 is a perspective view of a base support member provided with an anchor member adapted to be secured between the seat back and seat cushion of an automobile seat.
Figure 16:
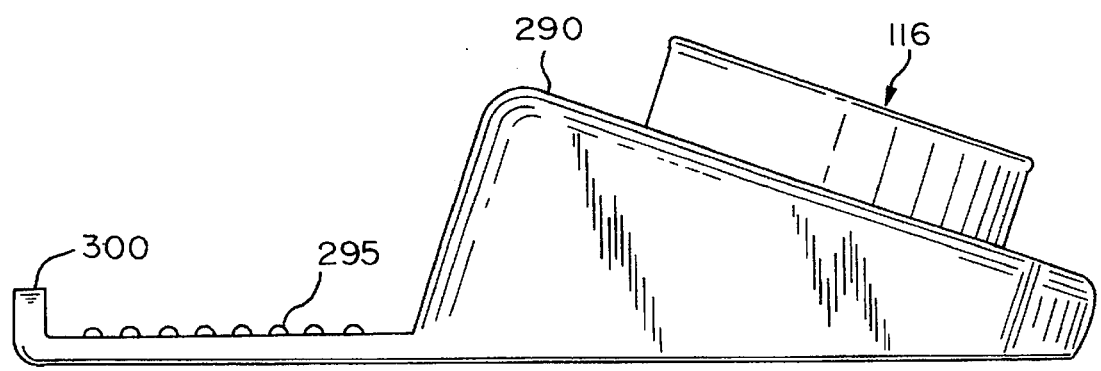
FIG. 16 is a side elevational view of a base support member shown in FIG. 15.
Figure 17:
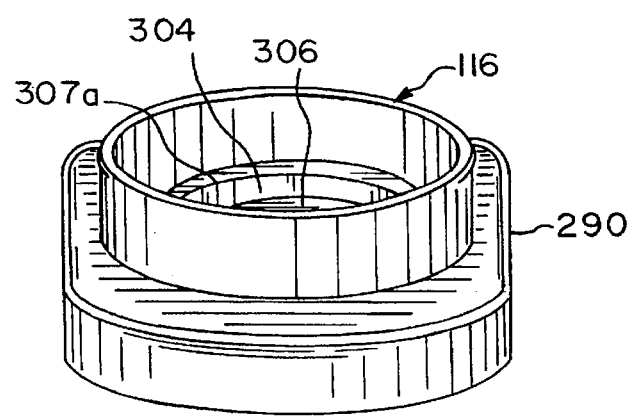
FIG. 17 is a front elevational view of the base support member shown in FIG. 15.

FIGS. 12–14 disclose a representative beverage container, such as a mug, for use with the beverage container holder of the foregoing BRIDGES applications and patent, as well as container holder 100, and base support members 115 and 116 of the present invention. Such a beverage container provides a wedging action resulting from two spaced points of contact at points 107a, 207a and 307a, and points 109, 209 and 309 of base support members 100, 115 and 116, respectively. As explained in the foregoing applications and patent to BRIDGES, such a beverage container is provided with a specialized structure for providing wedging. Thus, beverage container 55 comprises an upper portion 60 for holding the actual beverage, a base portion 65 connected to upper portion 60 and including a substantially vertical surface 66 disposed inwardly from the container outer surface 67 and extending upwardly from the container lower surface 68, and optionally, a handle 70. Base portion 65 includes a bottom support member 75 that has a recessed area 80 such that an outer annular surface 85 is thereby formed. As discussed in the foregoing applications and patent to BRIDGES, a 90° angle is preferably formed between annular surface 85 and surface 66. This provides a vertical surface which contacts protrusion 108, 208 or 308 of container holder 100 or base support member 115 or 116. Thus, when beverage container 55 is tipped within base support, vertical surface 66 contacts outer surface 109, 209 or 309 of protrusion 108, 208 or 308, of container holder 100 or base support member 115 or 116, respectively, and outer wall 67 contacts inner surface 107, 207 or 307 of wall 102, 202 or 302 at upper end 107a, 207a, or 307a, respectively, thereby obtaining a secure wedging action. A standard 12 ounce beverage can may interact with surface 109, 209, 307 or 309 at 109a, 209a, 307a or 309a, and protrusion 108, 208 or 308 to provide two spaced points of contact for secure wedging, as is explained in the aforementioned patent and applications to BRIDGES.

Upper portion 60 of beverage container 55, as illustrated, is merely representative of the various constructions which may be utilized. In this way, container holder 100 and base support members 115 and 116 are capable of interacting with a variety of containers, container bases and base portions of suitable article supports.

The base support members illustrated in FIGS. 1A and 1B are ideally suited to be secured on a planar surface such as the dashboard of a car, or integrally formed with a dashboard of a car. However, since not all dashboards have a generally horizontal surface on which to place such base support or a suitable location at which such a base support member can be integrally molded, several alternative embodiments are provided.

Figure 7:
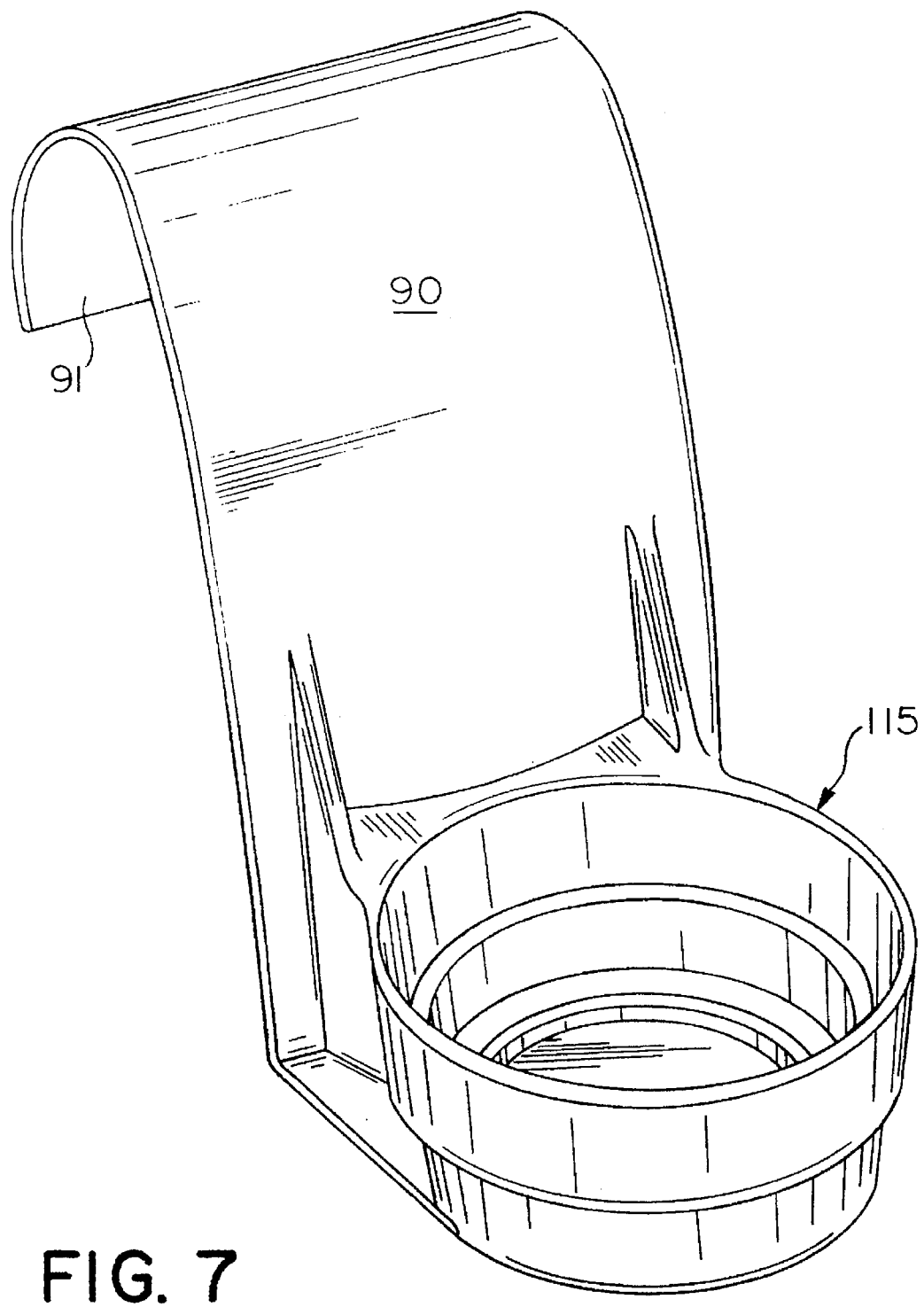
FIG. 7 is a perspective view of a base support member and holder of an embodiment of this invention, similar to that shown in FIGS. 1A and 1B, but capable of being suspended from an automotive door.

The base support members of the present invention can also be integrally formed with a suitable support, such as the bracket as shown in FIG. 7. Thus, base support member 115 can be integrally formed with a hanger bracket 90, which preferably is provided with a portion 91 for interacting with the window slot of an automobile door to thereby support bracket 90 and base support member 115.

Figure 18:
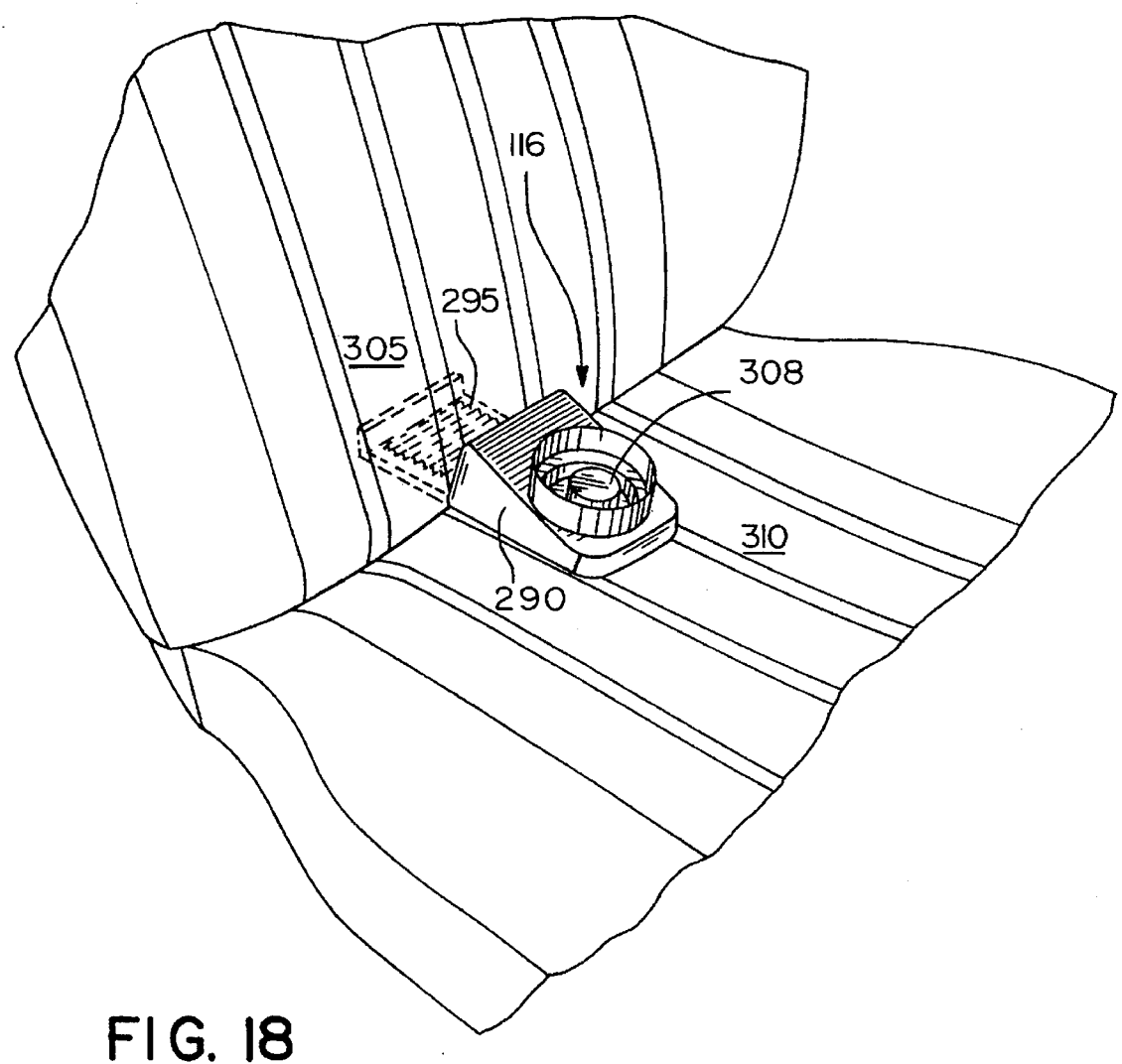
FIG. 18 is a perspective view showing the base support member of FIG. 15 when used in an automobile.

Alternatively, the base support member of this invention can be integrally molded with the anchor member shown in FIGS. 15–18. In such embodiments, the beverage container holder 116 can be integrally molded with support structure or anchor 285. Support structure 285 comprises an inclined frontal surface 290 and a generally flat rear surface 295 which terminates in an upwardly turned lip 300. As shown in FIG. 18, rear surface 295 is adapted to be inserted between a back cushion 305 and a seat cushion 310 of an automotive vehicle. The remaining frontal surface 290 projecting outwardly from back cushion 305 is generally inclined to compensate for the rearward sloping of seat cushion 310. Thus, when a beverage container or the base member of an article support of the present invention is seated within the holder, it will be supported in a relatively upright position. As will be readily apparent, the combined base support member and holder of this invention can be provided with a support structure in the same way.

Figure 8:
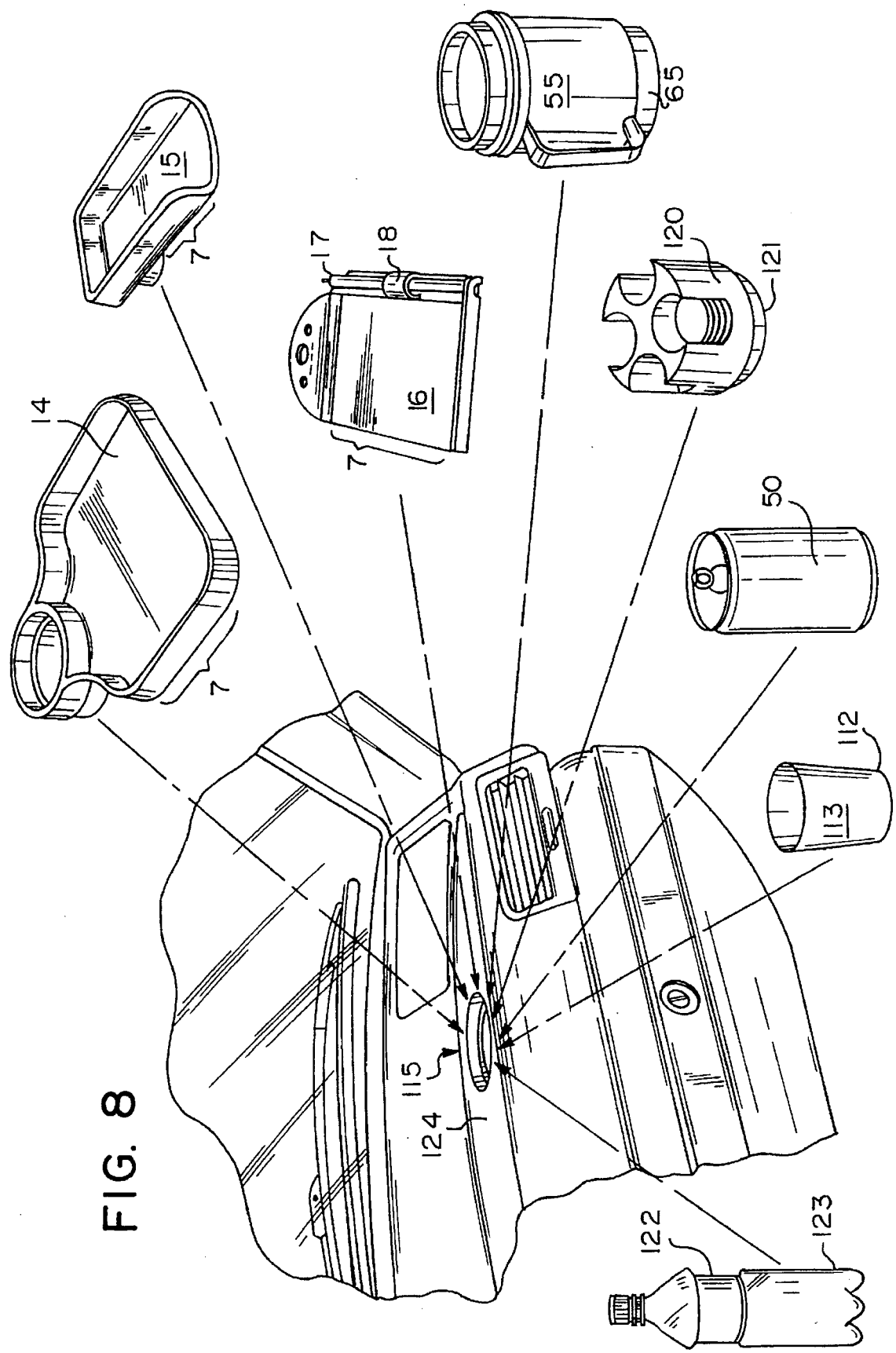
FIG. 8 is an exploded representation disclosing various article supports and containers capable of being employed in the article support system of FIGS. 1A or 1B, with the base support member of FIG. 1A or 1B being installed in a top surface of a dashboard of an automotive vehicle.

The article support portion 7 of article support 1 can comprise a number of different article supports, as is illustrated in FIG. 8. Thus, in addition to or instead of the tray, article support portion 7 can comprise a holder 15 for eyeglasses or a cellular telephone, a notepad holder 16, a holder 18 for a writing implement 17 and combinations thereof. Other articles and article supports which can be incorporated into the article support portion of the article support of the present invention will be readily apparent to those of ordinary skill in the art, including but not limited to mirrors, compasses, calculators, audio cassette or compact disc holders and the like.

The system depicted in FIG. 8 can preferably employ base support member 115 of FIG. 1B. As depicted in FIG. 8, in addition to the article support members of the present invention, base support member 115 is especially adapted to receive base portion 65 of mug 55 described above, base portion 121 of coinholder 120, or the base portion of beverage can 50 as described in the aforementioned applications and patent to BRIDGES, base 112 of "paper" cup 113 or base 123 of bottle 122.

The interaction of the base support 115 and, e.g., a 20 ounce soft drink bottle, is illustrated in FIG. 11, with the soft drink bottle being illustrated schematically. Base 123 of bottle 122 can be friction fit into upper portion 299 of base support 115. Alternatively, bottom wall 124 of base 123 can be supported by horizontal surface 206. As will be readily understood, base 123 of bottle 122 can be of various configurations, depending on a variety of factors, such as market trends, manufacturer, etc.

The interaction of the base portion of "paper" cup 113 and base support member 116 is shown in FIG. 10. Thus, referring to FIGS. 10 and 1B, preferably, annular groove 211 receives the generally tubular base portion 112 of cup 113. Advantageously, the interaction of base portion 112 of cup 113 with base support member 116, including groove 211 also provides a wedging action resulting from two spaced points of contact between outer surface 114a of wall 114 of cup 113, and upper end 307a of inner surface 307 of base support member 116 to provide a first point of contact P1, and vertical surface 409 of groove 311 and inner surface 118 of base portion 112 to provide a second point of contact P2.

Figure 9:
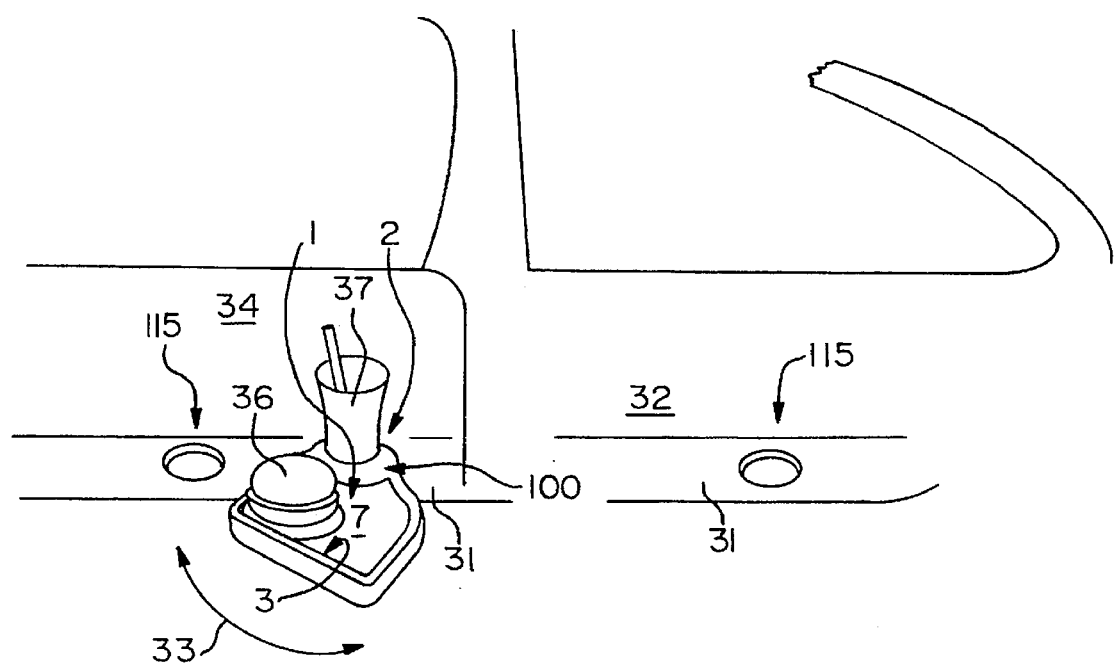
FIG. 9 is a schematic representation of the article support system of the invention wherein the base support member and holder of FIGS. 1A or 1B is installed in an armrest of an automobile door and automobile side panel.

A base support member of the invention can be installed as an integral part of a vehicle dashboard, such as dashboard top 124, as shown in FIG. 8. Alternatively it can be secured to the dashboard top by means of the adhesive tab discussed above or secured to a vehicle seat by means of an anchor, or hung from a vehicle door by means of bracket 90. Alternatively, the base support member of this invention, such as that shown in FIG. 1A or 1B, can be integrally formed as part of the armrest 31 of a door 32 or side panel 34 of a motor vehicle, as is shown in FIG. 9. As illustrated in FIG. 9, the article support systems of the present invention have the additional advantage that second end 3, and consequently article support portion 7, of article support 1 can be readily moved horizontally, while base member 4 of article support 1 is being supported by base support member 115. Thus, second end 3 can be readily moved along arcuate path 33 with a minimum of frictional resistance, even while article support 1 is supported by base support 115, and even under the wedging conditions described above. FIG. 9 also depicts an additional advantage of the present invention whereby, in embodiments wherein article support portion 7 comprises a tray, a food item 36 can be supported by the article support portion 7 and a beverage container 37 can be supported by base support portion 100. In FIG. 9, as will be readily appreciated, the base support member 115 supporting article support 1 cannot be seen, because of the visual obstruction presented by article support 1.

Figure 19:
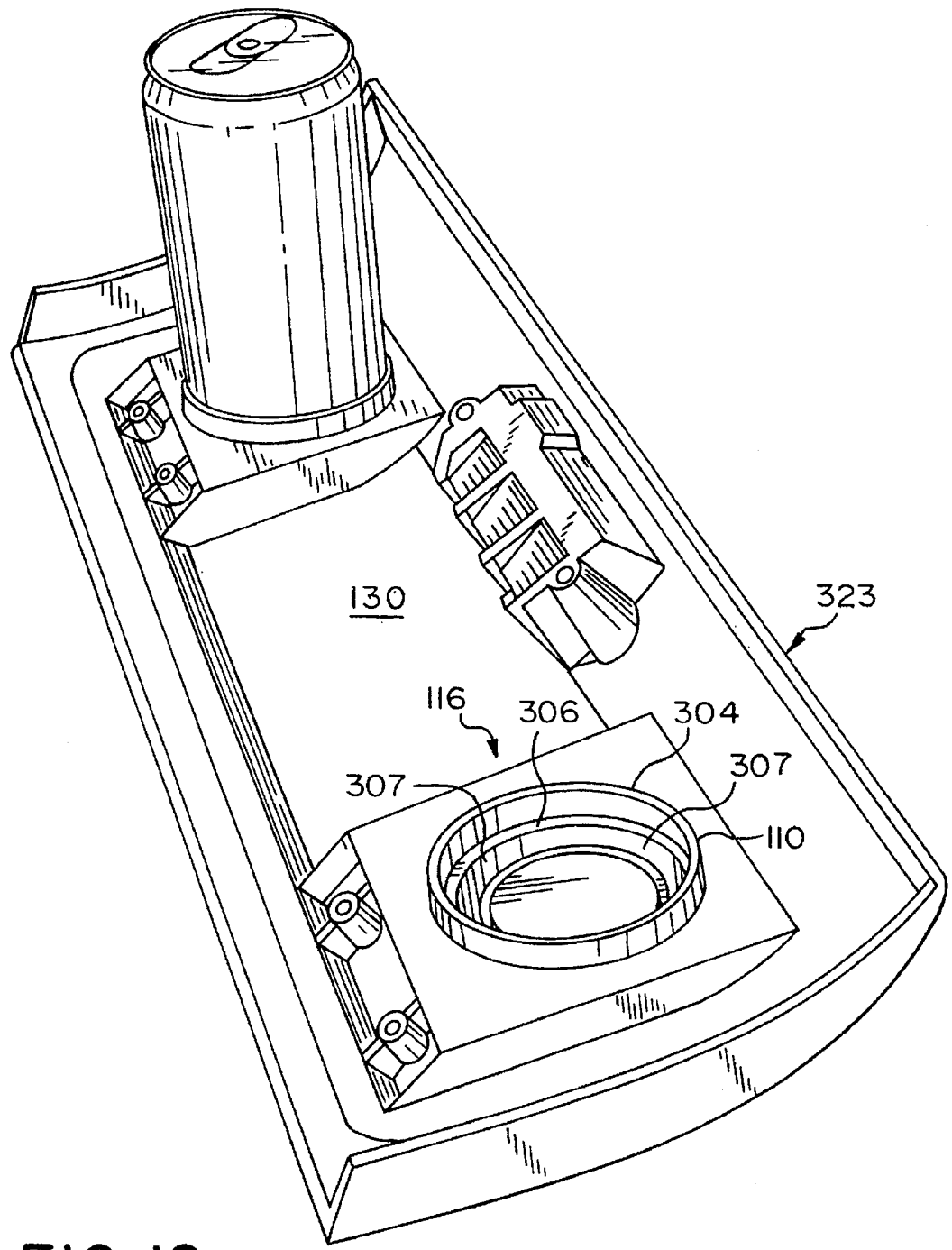
FIG. 19 is a perspective view of a base support member of the invention employed in a door to an interior compartment of an automobile.
Figure 20:
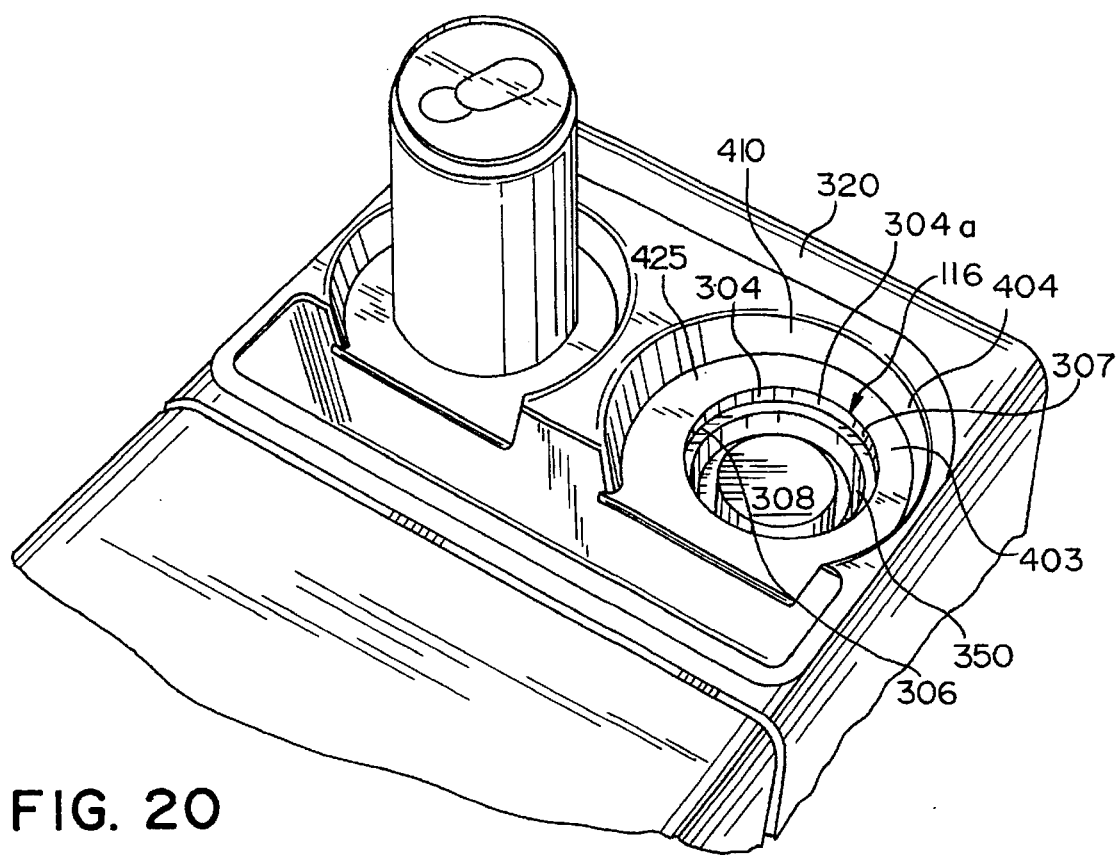
FIG. 20 is a schematic perspective view of a base support member of the invention employed in a central console of an automobile.
Figure 21:
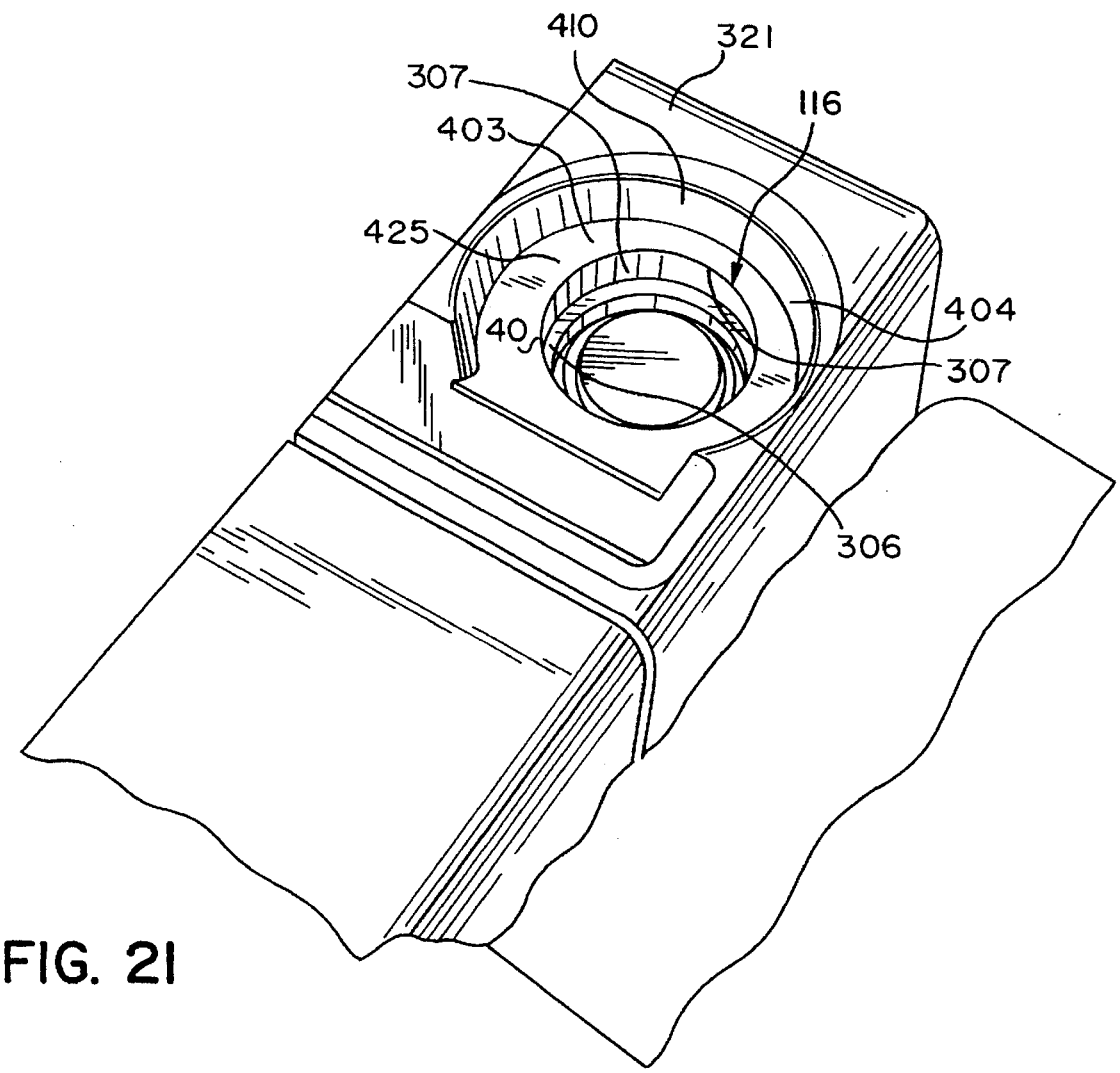
FIG. 21 is a schematic perspective view of the base support member of FIG. 20 installed in an armrest of a motor vehicle seat.

Additionally, the base support member can be installed in a console 320, as shown in FIG. 20, or the armrest 321 of a seat of motor vehicle, such as "captains chairs" popularly installed in vans and recreational vehicles, as in FIG. 21, or the interior surface 130 of a door 323 to an interior compartment, e.g., a glove box of a motor vehicle, as shown in FIG. 19.

In FIGS. 20 and 21, the base support member 116 comprises the same elements as base support member 116 of FIG. 1B, as illustrated. Furthermore, a further additional wall 403 extends from the upper end 304a of wall 304, and preferably comprises a generally planar portion 425 and which is also parallel with base support wall 350. In such embodiments, multiple cavities for receiving beverage container holders are provided. For example, in the embodiment of FIGS. 20 and 21, 3 cavities, each having a different diameter, and capable of supporting a beverage container are provided. As will be readily understood from the foregoing discussion of FIGS. 12–14 and the aforementioned applications and patent to BRIDGES, inner surface 307 has an inner diameter which is slightly larger than the outer diameter of a standard beverage can, so as to receive the base of such can and provide secure wedging as, discussed above.

Preferably, additional wall 403 provides a generally horizontal surface. Preferably, wall 403 further comprises an upwardly extending wall portion 404, which comprises surface 410. Moreover, it will be readily appreciated that generally annular surface 403 is larger, and also has a substantially greater surface area, than surface 306.

The article supports and base support members of the present invention can be readily fabricated by those of ordinary skill in the art using well known and fully conventional techniques. Injection molding is a particularly suitable technique.

Suitable materials include conventional plastics, e.g., conventional polymers which are readily commercially available. Preferred polymers include homopolymers or copolymers of polyolefins, for example, polyethylene, polypropylene and the like. Suitable additives and fillers can be readily selected by those of ordinary skill in the art.

The article support of the present invention is also particularly suited to be marketed in the form of a kit. Such kits generally should comprise at least one article support member of the invention and, preferably a base support member, such as member 115 or 116 supported with adhesive tab 251 and release layer 261. Of course the kit can also comprise one or more article support members comprising an article support portion selected from the group consisting of a tray, a notepad support, a support for a writing implement, a support for eyeglasses, a support for a cellular phone, a coinholder, a beverage container and combinations thereof.

The article support systems of the present invention exhibit surprising performance. Thus, they are capable of supporting articles a surprising distance from the central axis of the base support member, especially when compared to the depth of the base support member. Typical depths for preferred embodiments of base support members 115 and 116 of the present invention are on the order of from about 1.25 to about 1.5 inches, preferably from about 1.25 to about 1.4 inches, and most preferably about 1.37 inches as measured from the top of a surface supporting base support member 115 or 116 to the top of the base support member. The article support systems of the present invention can, for example, support articles a distance from the central axis of the base support member of at least about 1 to about 10 times the depth of the base support member, preferably from about 1 to 5 times the depth of the base support member. This is a surprising degree of support, especially in view of low resistance to coaxial force exhibited by the present invention, and the low resistance the article support offers to horizonal movement of the article support portion, i.e., the low resistance to rotational force. Thus, the base portions of the article support members of the present invention can be readily inserted into the base support members of the invention as shown in FIG. 1A, and the article support portion can be readily moved horizontally, as is shown in FIG. 9.

The wedging action discussed above can result from downward movement of the second end of the article support member, tilting of the base member of the article support, or both.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A system for supporting at least one article, comprising:
   a member comprising a first end including a base member projecting therefrom, and a second end including an article support portion capable of supporting said at least one article;
   a base support member comprising a wall defining a cavity for receiving a portion of said base member projecting from said first end of said member, said wall comprising an interior wall surface in said cavity, and a protrusion in said cavity; and
   said base member comprising a first portion capable of interacting with said protrusion, and a second portion capable of interacting with said interior wall surface to cause wedging in response to:
   tilting of said base member within said base support member.

2. The article support system of claim 1, wherein said first portion of said base member comprises a generally tubular, inner wall portion and said second portion of said base member comprises a generally tubular outer wall portion.

3. The article support system of claim 2, wherein said protrusion comprises a generally annular rib disposed in said cavity and projecting upwardly from said base support member.

4. The article support system of claim 3, wherein said cavity formed by said wall of said base support member comprises an upper end having a diameter, and an additional wall extends from said upper end.

5. The article support system of claim 4, wherein said additional wall comprises a planar wall which is substantially parallel with a lower surface of said base support member.

6. The article support system of claim 5, wherein said additional wall further comprises an upwardly extending wall portion.

7. The article support system of claim 2, wherein said protrusion comprises a cylinder disposed in said cavity and projecting upwardly from said base support member.

8. The article support system of claim 1, wherein said article support portion comprises a supporting member selected from the group consisting of a tray, a notepad support, a support for a writing implement, a support for eyeglasses, a support for a cellular phone, and combinations thereof.

9. The article support system of claim 8, wherein said article support portion comprises a tray.

10. The article support system of claim 8, wherein said article support portion comprises a notepad support.

11. The article support system of claim 8, wherein said article support portion comprises a support for a writing implement.

12. The article support system of claim 8, wherein said article support portion comprises a support for eyeglasses.

13. The article support system of claim 1, wherein said base support member is built into an interior location of an automotive vehicle.

14. The article support system of claim 1, wherein said base support member is integrally formed with an armrest of an automotive vehicle.

15. The article support system of claim 1, wherein said base support member is integrally formed with a dashboard of an automotive vehicle.

16. The article support system of claim 1, wherein said base support member is integrally formed with a door of an interior compartment of an automotive vehicle.

17. The article support system of claim 1, wherein said base support member is integrally formed with a console of an automotive vehicle.

18. The article support system of claim 1, wherein said base support member comprises an anchoring device.

19. The article support system of claim 18, wherein said anchoring device comprises an adhesive tab including a removable protecting sheet.

20. The article support system of claim 19, wherein said anchoring device comprises an element adapted to be inserted between a seat cushion and a back cushion of an automotive vehicle.

21. The article support system of claim 1, wherein said base support member comprises a hanger bracket.

22. The article support system of claim 1, wherein said first end of said member comprises a beverage container holder.

23. The article support system of claim 22, wherein said beverage container holder comprises:
a holder base support member for supporting a beverage container, the container including a container base including a substantially vertical surface disposed inwardly from a container outer surface and extending upwardly from a container lower surface;
a holder wall connected to said holder base support member and forming therewith a cavity for receiving therein the container base of the beverage container, said holder wall being configured such that the container base of the beverage container is loosely disposed in said cavity and removable from said cavity in a vertical direction without substantial frictional resistance, said holder wall including a top surface; and
a holder protrusion, extending from said holder base support member, for providing a wedging action upon tilting of the beverage container resting on said base support member, said holder protrusion including a holder wedge top surface, said holder wedge top surface being spaced a distance below said holder wall top surface such that wedging between at least the substantially vertical surface of the beverage container and said holder protrusion thereby restrains the beverage container from further tilting and prevents contents therein from spilling;
wherein said holder protrusion and said holder wall are configured and dimensioned relative to one another such that tilting of the beverage container in said cavity causes engagement between the beverage container and said beverage container holder at two spaced points of contact occurring at said holder wall and said holder protrusion, said two spaced points of contact including a first contact point located at an inner surface of said holder wall and a second contact point located at an outer surface of said holder protrusion and at a height a distance below the height of said first contact point.

24. The article support system of claim 23, wherein said holder protrusion of said beverage container holder comprises a cylinder disposed in said cavity and projecting upwardly from said holder base support member.

25. The article support of claim 23, wherein said holder protrusion of said beverage container holder comprises an annular rib disposed in said cavity and projecting upwardly from said holder base support member.

26. The article support system of claim 24, wherein said cavity formed by said holder wall of said holder base support member comprises an upper end having a diameter, and an additional wall extends from said upper end.

27. The article support system of claim 26, wherein said additional wall comprises a planar wall which is substantially parallel with a lower surface of said base support member.

28. The article support system of claim 27, wherein said additional wall further comprises an upwardly extending wall portion.

29. The article support system of claim 1, said base member extending beyond a plane formed by said article support portion.

30. The article support system of claim 1, said tilting of said base member comprising at least one of:
a downward movement of said second end to thereby restrain said second end from further downward movement, and
a tilting of said base member to thereby restrain said base member from further tilting.

31. The article support system of claim 1, said tilting effected by a downward force applied to said article support portion.

32. An article support, comprising:
a first end including a base member projecting therefrom, and a second end including an article support portion capable of supporting at least one article;
said base member comprising a first portion capable of interacting with a protrusion in a base support member, and a second portion capable of interacting with an interior wall surface defining a cavity in the base support member to cause wedging in response to:
tilting of said base member within said base support member.

33. The article support of claim 32, wherein said first end comprises a beverage holder.

34. The article support of claim 33, wherein said first portion of said base member for interacting with said base support member comprises a generally tubular, generally vertical inner wall portion, and said second portion of said base member comprises a generally tubular, generally vertical outer wall portion.

35. The article support of claim 34, wherein said container holder of said first end comprises:

a holder base support member for supporting a beverage container, the container including a container base including a substantially vertical surface disposed inwardly from a container outer surface and extending upwardly from a container lower surface;

a holder wall connected to said holder base support member and forming therewith a cavity for receiving therein the container base of the beverage container, said wall being configured such that the container base of the beverage container is loosely disposed in said cavity and removable from said cavity in a vertical direction without substantial frictional resistance, said holder wall including a top surface; and a holder protrusion, extending from said container base support member, for providing a wedging action upon tilting of the beverage container resting on said holder base support member, said holder protrusion including a top surface, said holder protrusion top surface being spaced a distance below said holder wall top surface such that wedging between at least the substantially vertical surface of the beverage container and said holder protrusion thereby restrains the beverage container from further tilting and prevents contents therein from spilling;

wherein said holder protrusion and said holder wall are configured and dimensioned relative to one another such that tilting of the beverage container in said cavity causes engagement between the beverage container and said beverage container holder at two spaced points of contact occurring at said holder wall and said holder protrusion, said two spaced points of contact including a first contact point located at an inner surface of said holder wall and a second contact point located at an outer surface of said holder protrusion and at a height a distance below the height of said first contact point.

36. The article support of claim 35, wherein said holder protrusion of said beverage container holder comprises an annular rib disposed in said cavity and projecting upwardly from said holder base support member.

37. The article support of claim 35, wherein said protrusion of said container holder comprises a cylinder disposed in said cavity and projecting upwardly from said base support member.

38. The article support of claim 35, wherein said cavity formed by said holder wall of said holder base support member comprises an upper end having a diameter, and an additional wall extends from said upper end.

39. The article support of claim 38, wherein said additional wall comprises a planar wall which is substantially parallel with a lower surface of said base support member.

40. The article support of claim 39, wherein said additional wall further comprises an upwardly extending wall portion.

41. The article support of claim 35, wherein said second end comprises a tray.

42. The article support of claim 32, said tilting of said base member comprising at least one of:

downward movement of said second end to thereby restrain said second end from further downward movement; and tilting of said base member to restrain said base member from further tilting.

43. The article support system of claim 32, said tilting effected by a downward force applied to said article support portion.

44. An article support for supporting at least one article comprising:

a member comprising a first end, and a second end including an article support portion capable of supporting said at least one article;

said first end comprising a base portion including a wall, said wall including a top side and a bottom side and configured such that, at said top side, said wall forms a container holder and at said bottom side, said wall forms a portion constructed and arranged to interact with an automotive container holder in an automotive vehicle to support said member; and tilting said bottom side, with respect to said automotive container holder, by a downward force applied to said article support portion, to cause wedging of said bottom side against an interior surface of said automotive container holder.

45. The article support of claim 44, wherein said container holder at said top side of said wall comprises a first automotive beverage container holder and said automotive container holder in said automotive vehicle comprises a second automotive beverage container.

46. The article support of claim 44, said top side extending below a plane formed by said article support portion.

* * * * *